(12) United States Patent
Kim et al.

(10) Patent No.: US 9,356,745 B2
(45) Date of Patent: May 31, 2016

(54) METHOD FOR TRANSMITTING ENHANCED CONTROL CHANNEL IN A WIRELESS COMMUNICATION SYSTEM AND APPARATUS THEREFOR

(71) Applicant: LG Electronics Inc., Seoul (KR)

(72) Inventors: Myoungseob Kim, Anyang-si (KR); Seungmin Lee, Anyang-si (KR); Inkwon Seo, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 54 days.

(21) Appl. No.: 14/390,950

(22) PCT Filed: Mar. 26, 2013

(86) PCT No.: PCT/KR2013/002489
§ 371 (c)(1),
(2) Date: Oct. 6, 2014

(87) PCT Pub. No.: WO2014/003293
PCT Pub. Date: Jan. 3, 2014

(65) Prior Publication Data
US 2015/0078326 A1   Mar. 19, 2015

Related U.S. Application Data

(60) Provisional application No. 61/664,139, filed on Jun. 25, 2012.

(51) Int. Cl.
*H04L 5/00* (2006.01)
*H04J 11/00* (2006.01)

(52) U.S. Cl.
CPC ............. *H04L 5/0007* (2013.01); *H04J 11/005* (2013.01); *H04L 5/0053* (2013.01); *H04L 5/0073* (2013.01)

(58) Field of Classification Search
None
See application file for complete search history.

(56) References Cited

U.S. PATENT DOCUMENTS

| | | | | |
|---|---|---|---|---|
| 2013/0039284 A1* | 2/2013 | Marinier | ................. | H04L 5/001 370/329 |
| 2013/0083750 A1* | 4/2013 | Nazar | ................... | H04L 5/0055 370/329 |

(Continued)

OTHER PUBLICATIONS

Ericsson et al., "Multiplexing of two ePDCCH types", R1-122003, 3GPP TSG RAN WG1 #69, Prague, Czech Republic, May 21-25, 2012.
HTC, "eREG and eCCE definitions for ePDCCH", R1-122331, 3GPP TSG RAN WG1 #69, Prague, Czech Republic, May 21-25, 2012.

(Continued)

*Primary Examiner* — Brian Roberts
(74) *Attorney, Agent, or Firm* — Dentons US LLP

(57) ABSTRACT

The present invention relates to a method for transmitting a downlink control channel in a wireless communication system, and an apparatus therefor. Specifically, the method for transmitting an enhanced a physical downlink control channel (EPDCCH) from a serving cell comprises the steps of: forming a plurality of enhanced resource element groups (EREGs) by dividing available resource elements, comprised in one physical resource block (PRB) pair, into a predetermined number; forming an enhanced control channel element (ECCE), which is a resource allocation unit for the EPDCCH, by selecting one or more EREGs from among the plurality of EREGs; and transmitting the EPDCCH by means of the transmission resource allocated, for each ECCE, for the EPDCCH, wherein one or more EREGs forming the ECCE is selected on the basis of a cell identifier of the serving cell and/or an index of the one PRB pair.

10 Claims, 20 Drawing Sheets

(56) References Cited

U.S. PATENT DOCUMENTS

| | | | |
|---|---|---|---|
| 2013/0114522 A1* | 5/2013 | Frenne | H04L 5/0094 370/329 |
| 2013/0194931 A1* | 8/2013 | Lee | H04L 5/0053 370/241 |
| 2013/0242904 A1* | 9/2013 | Sartori | H04L 5/0053 370/329 |
| 2013/0272214 A1* | 10/2013 | Zhu | H04W 28/02 370/329 |

OTHER PUBLICATIONS

Zte et al., "Way forward on resource mapping for ePDCCH", R1-121874, 3GPP TSG RAN WG1 #68bis, Jeju, Korea, Mar. 26-30, 2012.

Ericsson et al., "DCI multiplexing by eREG", R1-122001, 3GPP TSG RAN WG1 #69, Prague, Czech Republic, May 21-25, 2012.

Intel corporation, "On the definition of eCCE/eREG", R1-122652, 3GPP TSG RAN WG1 #69, Prague, Czech Republic, May 21-25, 2012.

* cited by examiner (a) control-plane protocol stack (b) user-plane protocol stack (a) 1TX or 2TX (b) 4 TX cyclic shift of EREG index
or permutation (ECCE axis)

METHOD FOR TRANSMITTING ENHANCED CONTROL CHANNEL IN A WIRELESS COMMUNICATION SYSTEM AND APPARATUS THEREFOR

This Application is a 35 U.S.C. §371 National Stage entry of International Application No. PCT/KR2013/002489, filed Mar. 26, 2013, which claims benefit of Provisional Application No. 61/664,139 filed Jun. 25, 2012, both of which are incorporated by reference in their entirety herein.

TECHNICAL FIELD

The present invention relates to wireless communication system, and more particularly, to a method for transmitting a downlink control channel in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the conventional problem is to provide a method for transmitting a downlink control channel in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention to solve the aforementioned problem, a method for transmitting an enhanced a physical downlink control channel (EPDCCH) from a serving cell in a wireless communication system comprises the steps of configuring a plurality of enhanced resource element groups (EREGs) by dividing available resource elements, which are included in one physical resource block (PRB) pair, into a predetermined number; configuring an enhanced control channel element (ECCE), which is a resource allocation unit for the EPDCCH, by selecting one or more EREGs from the plurality of EREGs; and transmitting the EPDCCH by means of transmission resources allocated for the EPDCCH in a unit of the ECCE, wherein one or more EREGs constituting the ECCE are selected on the basis of at least one of cell ID of the serving cell and index of the one PRB pair.

Moreover, the one or more EREGs are selected in accordance with EREG index configured by performing permutation for the plurality of EREGs.

Moreover, the permutation is performed in accordance with a pattern determined on the basis of at least one of the cell ID of the serving cell and the index of the one PRB pair. Preferably, the permutation is performed for the EREGs except for EREG that satisfies a predetermined condition, and the predetermined condition is characterized in that the EREG index is 0.

In another aspect of the present invention to solve the aforementioned problem, a serving cell for transmitting an enhanced physical downlink control channel (EPDCCH) in a wireless communication system comprises a radio frequency (RF) unit; and a processor, wherein the processor configures a plurality of enhanced resource element groups (EREGs) by dividing available resource elements, which are included in one physical resource block (PRB) pair, into a predetermined number, and configures an enhanced control channel element (ECCE), which is a resource allocation unit for the EPDCCH, by selecting one or more EREGs from the plurality of EREGs, the RF unit is configured to transmit the EPDCCH by means of transmission resources allocated for the EPDCCH in a unit of the ECCE, and one or more EREGs constituting the ECCE are selected on the basis of at least one of cell ID of the serving cell and index of the one PRB pair.

Advantageous Effects

According to the present invention, the base station may avoid interference between cells by configuring an enhanced downlink control channel differently for each cell.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 18 is a diagram illustrating an embodiment of a method for transmitting an EPDCCH on the basis of reference parameters in accordance with the present invention.

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

In a wireless access system, a user equipment receives information from a base station through a downlink (DL), and also transmits information to the base station through an uplink (UL). Examples of information transmitted and received between the user equipment and the base station include data and various kinds of control information. Various physical channels exist depending on types and usage of information transmitted or received between the user equipment and the base station.

Figure 1:
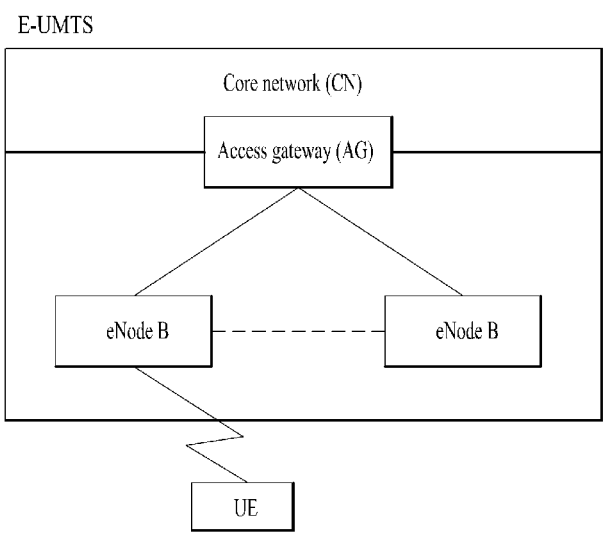
FIG. 1 is a diagram illustrating a network structure of an Evolved Universal Mobile Telecommunications System (E-UMTS) which is an example of a wireless communication system.
Figure 2:
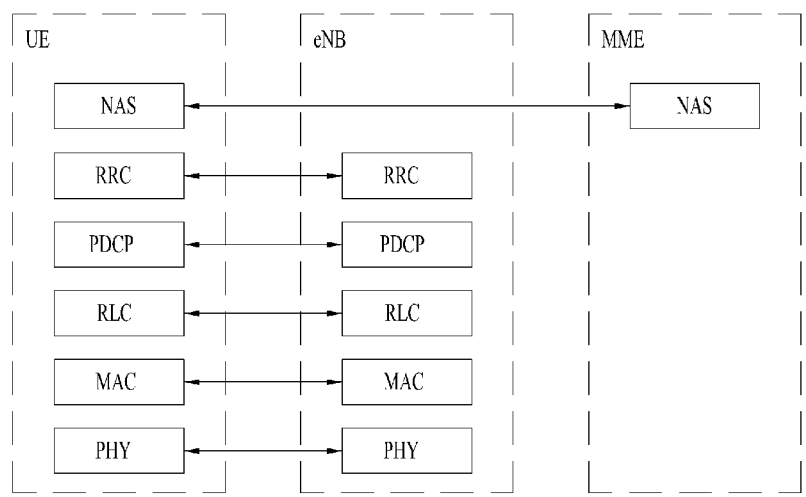
FIG. 2 is a diagram illustrating a structure of a radio interface protocol between a user equipment and an E-UTRAN based on the 3GPP radio access network standard.
Figure 2:
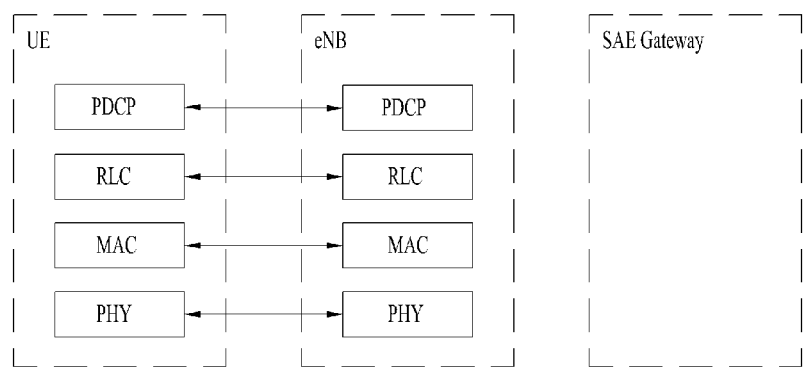

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
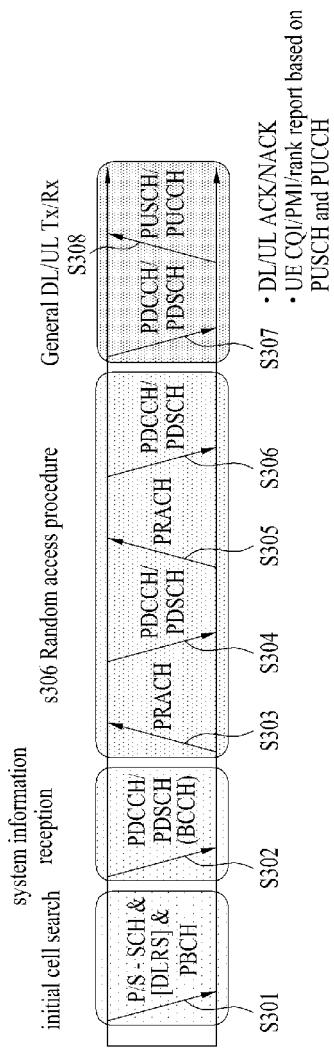
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, HARQ ACK/NACK will simply be referred to as HARQ-ACK or ACK/NACK(A/N). HARQ-ACK includes at least one of positive ACK (simply, ACK), negative ACK (NACK), DTX and NACK/DTX. The CSI includes CQI (Channel Quality Indicator), PMI (Precoding Matrix Indicator), and RI (Rank Indicator). Although the UCI is generally transmitted through the PUCCH, it may be transmitted through the PUSCH if control information and traffic data should be transmitted at the same time. Also, the UCI may non-periodically be transmitted through the PUSCH in accordance with request/command of the network.

Figure 4:
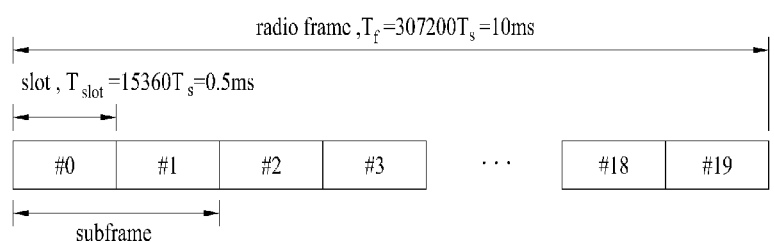
FIG. 4 is a diagram illustrating a structure of a radio frame used in an LTE system.

FIG. 4 is a diagram illustrating a structure of a radio frame used in an LTE system.

Referring to FIG. 4, a radio frame has a length of 10 ms ($327200 \times T_s$) and includes ten (10) subframes of an equal size. Each sub frame has a length of 1 ms and includes two slots. Each slot has a length of 0.5 ms ($15360T_s$). In this case, $T_s$ represents a sampling time, and is expressed by $T_s=1/(15 \text{ kHz} \times 2048)=3.2552 \times 10^{-8}$ (about 33 ns). The slot includes a plurality of orthogonal frequency division multiplexing (OFDM) symbols in a time domain, and includes a plurality of resource blocks (RBs) in a frequency domain. In the LTE system, one resource block includes twelve (12) subcarriers× seven (or six) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols included in the slot.

Figure 5:
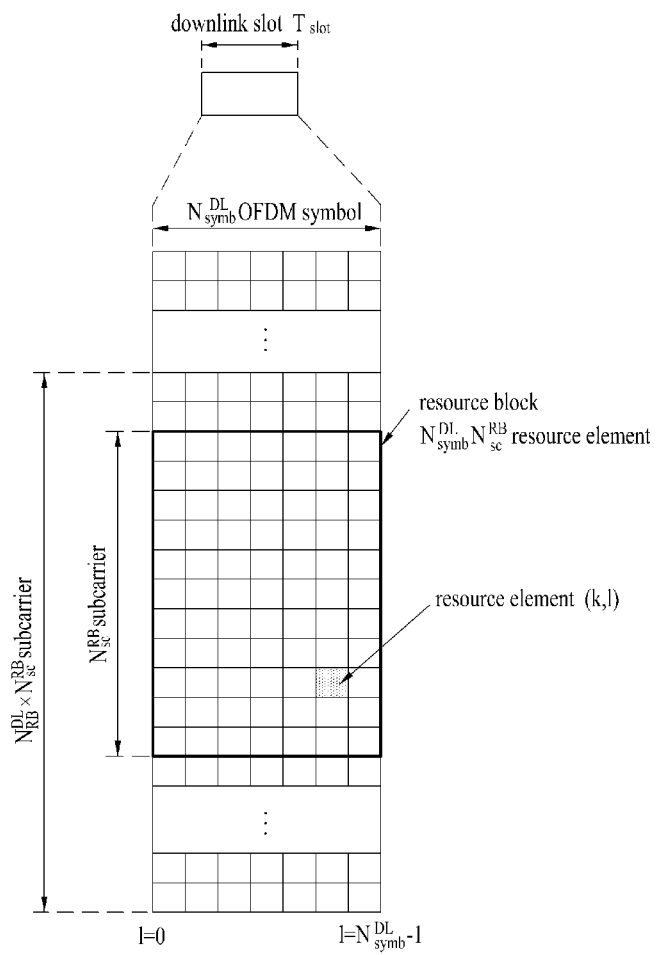
FIG. 5 is a diagram illustrating an example of a resource grid of a downlink slot.

FIG. 5 is a diagram illustrating a resource grid for a downlink slot.

Referring to FIG. 5, the downlink slot includes $N_{symb}^{DL}$ OFDM symbols in a time domain and $N_{RB}^{DL}$ resource blocks in a frequency domain. Since each resource block includes $N_{SC}^{RB}$ subcarriers, the downlink slot includes $N_{RB}^{DL} \times N_{SC}^{RB}$ subcarriers in the frequency domain. In FIG. 5, the downlink slot includes, but not limited to, seven OFDM symbols, and the resource block (RB) includes, but not limited to, twelve subcarriers. For example, the number of OFDM symbols included in the downlink slot may be varied depending on a length of cyclic prefix (CP).

Each element on the resource grid will be referred to as a resource element (RE). One resource block is indicated by one OFDM symbol index and one subcarrier index. One RB includes $N_{RB}^{DL} \times N_{SC}^{RB}$ resource elements. The number $N_{RB}^{DL}$ of resource blocks included in the downlink slot depends on a downlink transmission bandwidth set in a cell.

Figure 6:
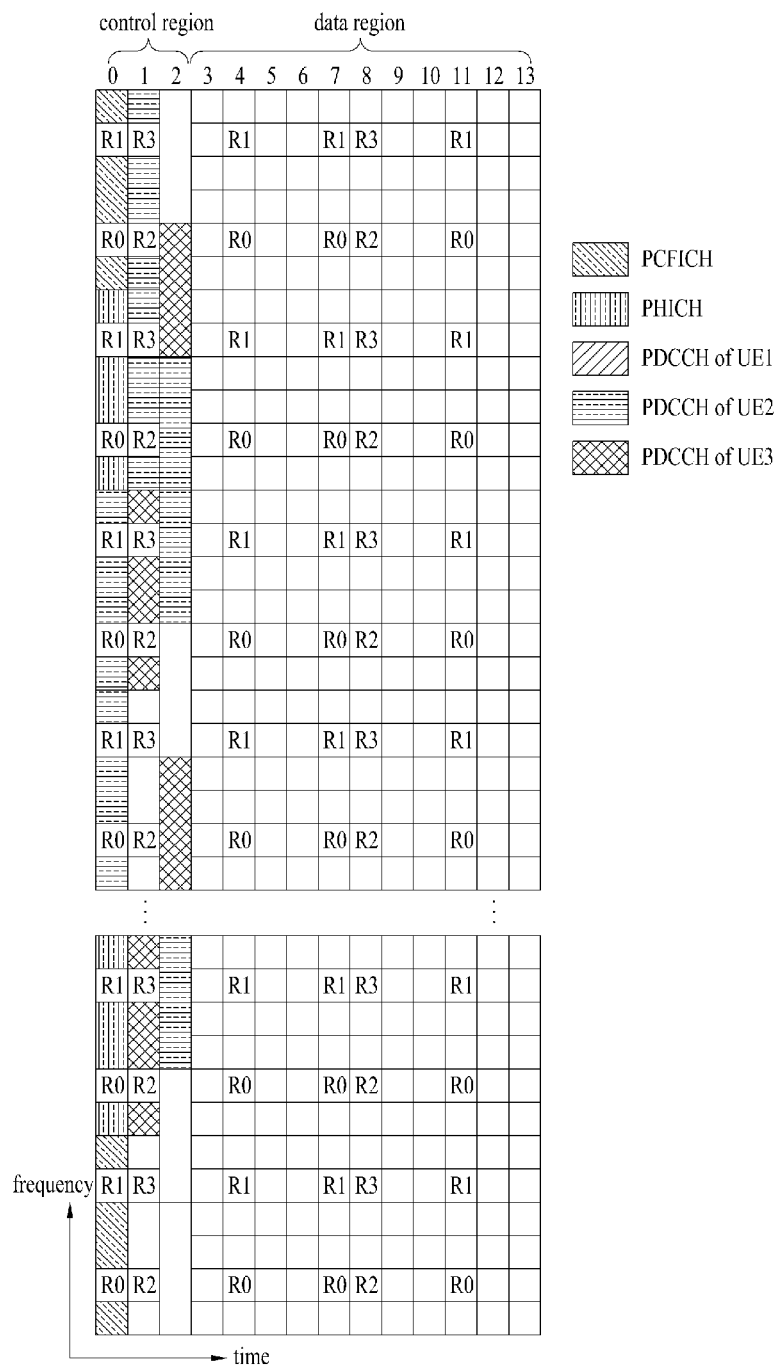
FIG. 6 is a diagram illustrating a control channel included in a control region of one subframe at a downlink radio frame.

FIG. 6 is a diagram illustrating a control channel included in a control region of one subframe at a downlink radio frame.

Referring to FIG. 6, the subframe includes fourteen (14) OFDM symbols. First one to three OFDM symbols are used as a control region in accordance with subframe configuration, and the other thirteen to eleven OFDM symbols are used as a data region. In FIG. 6, R1 to R4 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located in the first OFDM symbol and configured prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to carry HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH (group) is repeated three times to obtain diversity gain in the frequency domain and/or the time domain.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. The paging channel (PCH) and the downlink-shared channel (DL-SCH) are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH by using their RNTI information, and if there are one or more user equipments having RNTI called "A", the user equipments receive the PDCCH, and receive the PDSCH indicated by "B" and "C" through information of the received PDCCH.

Figure 7:
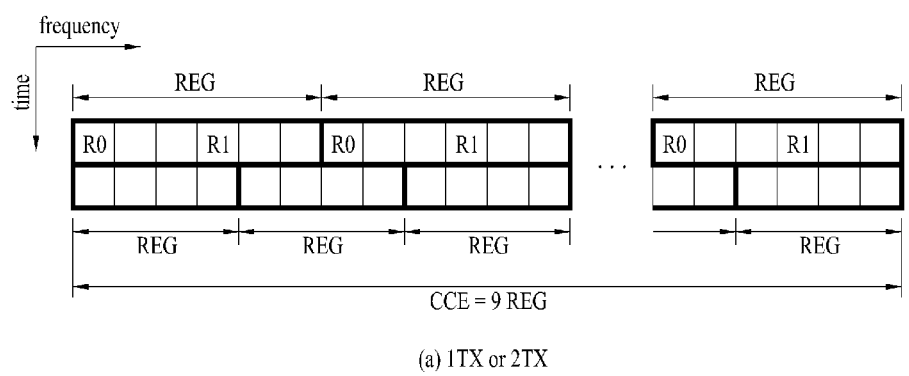
FIG. 7 is a diagram illustrating a resource unit used to configure a control channel.
Figure 7:
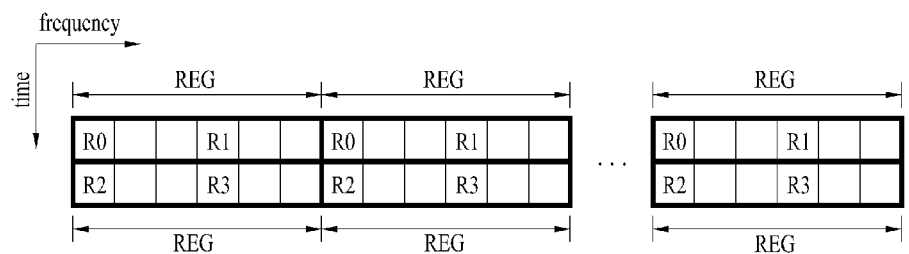

FIG. 7 is a diagram illustrating a resource unit used to configure a control channel. In particular, FIG. 7(a) illustrates that the number of transmitting antennas of the base station is 1 or 2, and FIG. 7(b) illustrates that the number of transmitting antennas of the base station is 4. Reference signal (RS) patterns are varied depending on the number of transmitting antennas but a configuration method of a resource unit related to the control channel is equal for the number of transmitting antennas.

Referring to FIGS. 7(a) and 7(b), a basic resource unit of the control channel is REG. The REG includes four neighboring resource elements (REs) except for RS. The REG is shown by a solid line. The PCFICH and the PHICH include four REGs and three REGs, respectively. The PDCCH includes control channel elements (CCEs) unit, wherein one CCE includes 9 REGs.

The user equipment is configured to identify CCEs, which are continuous or arranged in accordance with a specific rule, so as to identify whether PDCCH of L number of CCEs is transmitted thereto. A plurality of values of L may be considered by the user equipment to receive the PDCCH. CCE sets to be identified by the user equipment to receive the PDCCH will be referred to as a search space.

The search space may be classified into a UE-specific search space of which access is allowed for a specific user equipment only and a common search space of which access is allowed for all the user equipments. The user equipment monitors the common search space of which CCE aggregation levels are 4 and 8, and monitors the UE-specific search space of which CCE aggregation levels are 1, 2, 4 and 8. The common search space and the UE-specific search space may be overlapped with each other.

Also, a location of the first CCE (having the smallest index) at the PDCCH search space given to a random user equipment for each CCE aggregation level value is varied depending on the user equipment every subframe. This will be referred to as PDCCH search space hashing.

In a current wireless communication environment, data request for a network within a wireless communication system has been rapidly increased in accordance with the advent and spread of various devices, which require machine to machine (M2M) communication and high data transmission rate. In order to satisfy such increased data request, the communication technology has been developed towards the carrier aggregation technology, which is intended to use more frequency bandwidths efficiently, and the multi-antenna technology and the multi-base station cooperative technology, which are intended to increase data capacity within a limited frequency. Also, a wireless communication environment has evolved towards a direction that density of nodes that may be accessed by a user is increased. The system having nodes of high density may have higher system throughput through cooperation between the nodes. This system has more excellent throughput than a case where the respective nodes independently act as base stations (BS) (advanced BS (ABS), Node-B (NB), eNode-B (eNB), access point (AP), etc.) and are not cooperative with each other.

Figure 8:
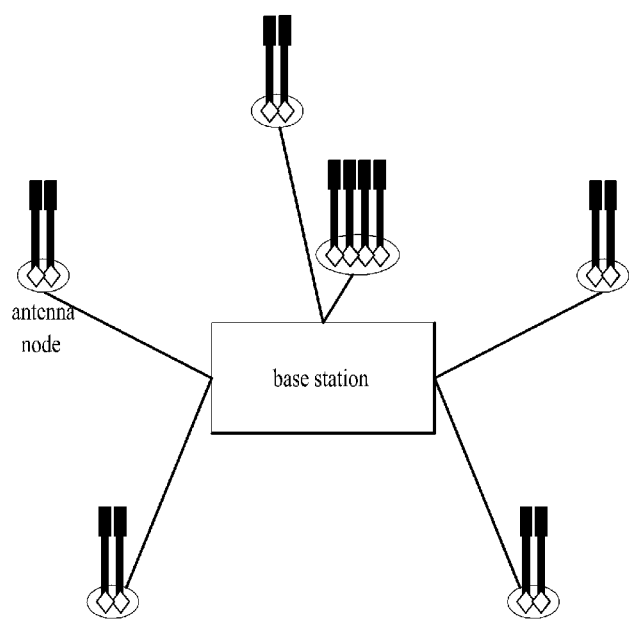
FIG. 8 is a diagram illustrating a multi-node system in a next generation communication.

FIG. 8 is a diagram illustrating a multi-node system in a next generation communication.

Referring to FIG. 8, if all of the nodes are controlled by one controller in respect of their transmission and reception and each node is operated as antenna group of one cell, such a system may be regarded as a distributed multi node system (DMNS). At this time, separate Node ID may be given to each node, or each node may be operated as some antenna within a cell without separate Node ID. However, if the nodes have different cell identifiers (IDs), the system may be regarded as a multi-cell system. If multi-cells are configured to be overlapped with one another in accordance with coverage, it may be referred to as a multi-tier network.

In the meantime, Node-B, eNode-B, PeNB, HeNB, RRH (Remote Radio Head), relay and distributed antenna may be nodes, and at least one antenna is installed in one node. The node may be referred to as a transmission point. Although the node is generally referred to as antenna group where antennas are spaced apart from each other at certain intervals, even though the node is defined as a random antenna group regardless of the interval, the node may be applied to the present invention.

The introduction of the aforementioned multi-node system and relay node enables application of various communication schemes, whereby channel quality may be improved. However, the introduction of a new control channel will be required to apply the aforementioned MIMO scheme and inter-cell cooperative communication scheme to the multi-node environment. In accordance with this need, the control channel of which introduction has been newly discussed is enhanced-PDCCH (E-PDCC), and it has been determined that the control channel is allocated to a data region (hereinafter, referred to as PDSCH region) not the conventional control region (hereinafter, referred to as PDCCH region).

Consequently, control information on a node may be transmitted to each user equipment through the E-PDCCH, whereby a problem that the existing PDCCH region may be insufficient may be solved. For reference, the E-PDCCH is not provided to the conventional legacy user equipment, and the LTE-A user equipment may only receive the E-PDCCH.

Figure 9:
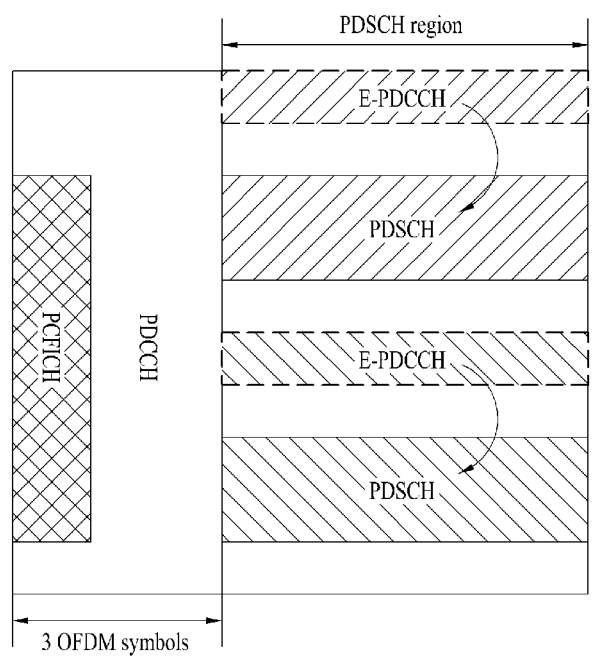
FIG. 9 is a diagram illustrating an example of an EPDCCH and a PDSCH scheduled by the EPDCCH.

FIG. 9 is a diagram illustrating an example of an E-PDCCH and a PDSCH scheduled by the E-PDCCH.

Referring to FIG. 9, the E-PDCCH may be used by partially defining a PDSCH region for transmitting data, and the user equipment should perform a blind decoding procedure for detecting its E-PDCCH. Although the E-PDCCH performs the same scheduling operation (that is, PDSCH and PUSCH control) as that of the conventional PDCCH, a greater number of E-PDCCHs may be allocated to the PDSCH region if the number of user equipments which have accessed the same node as that of RRH is increased. In this case, the number of times for blinding decoding that should be performed by the user equipment may be increased, whereby a problem may exist in that complexity may be increased.

Also, if the E-PDCCH is transmitted from a plurality of cells, a radio resource (for example, resource element (RE) constituting ECCE or EREG) for transmitting EPDCCH of a serving cell may interfere with or collide with a radio resource for transmitting EPDCCH of a neighboring cell.

Accordingly, the present invention suggests a mapping method (for example, mapping between ECCE and EREG or mapping between EREG and RE) configurable for an individual cell if ECCE which is a transmission unit of the EPD-CCH and EREG which is a configuration unit of the ECCE are defined.

According to the present invention, mapping between the ECCE and the EREG or mapping between the EREG and the RE may be varied per individual cell to avoid or randomize interference from the neighboring cell. Also, even though the number of REs (or the number of resource elements constituting ECCEs) constituting EREGs is configured differently (previously) within the same cell, an effect caused by imbalance of the resource elements (REs) may be minimized in such a way to change configuration of the resource elements (REs).

In other words, if permutation is not performed, EREGs of certain index (for example, supposing that EREG index is n, EREG#0, #4, #8, #12, . . . which are indexes satisfying "n mod 4=0") may only be selected. Accordingly, the number of resource elements per EREG may be varied, and a problem may occur in that the number of resource elements constituting ECCE configured from the EREGs is different from that of another ECCE. Accordingly, if permutation for avoiding interference is performed in accordance with one embodiment of the present invention, EREG is selected so as not be biased towards a specific index, and randomization may be performed such that the number of resource elements constituting ECCE generated from the selected EREG is not different from that of another ECCE. Moreover, since randomization may be performed subframe number-specifically as well as cell-specifically, the effect caused by imbalance of the number of resource elements included in the ECCE may be minimized.

Hereinafter, the embodiments of the present invention for achieving the aforementioned object will be described in more detail. However, it is to be understood that technical features of the present invention are not limited to the embodiments.

First Embodiment

In the first embodiment of the present invention, it is assumed that a common mapping rule between ECCE and EREG and/or a common mapping rule between EREG and RE exists for different cells and different PRB pairs. In this case, if ECCE of the same index is used within the PRB pair of the same index, all regions of the ECCE used in the serving cell may be affected by interference from the neighboring cell.

Accordingly, the first embodiment of the present invention suggests a mapping rule for avoiding interference between cells so as not to generate collision between resources for EPDCCH transmission if the common mapping rule exists.

In other words, when search spaces configured in the serving cell and the neighboring cell include PRB pairs of the same index, it is configured that different PRB pairs may be used between the respective cells.

Accordingly, in the present invention, if the same PRB pairs between the serving cell and the neighboring cell are configured by the EPDCCH search space, (physical) cell ID or virtual cell ID generated based on the physical cell ID may be used. In other words, a logical index of a reference PRB pair may be determined using the (physical or virtual) cell ID.

For example, supposing that $N_{RB}$ number of PRB pairs exist within the search space, offset of the reference PRB pair may be determined on the basis of at least any one of the number of PRB pairs and cell ID. For example, offset of the PRB pair may be determined as $cell_{ID}$ mod $N_{RB}$, and the EPDCCH resource may be mapped from the PRB pair of the determined index.

Figure 10:
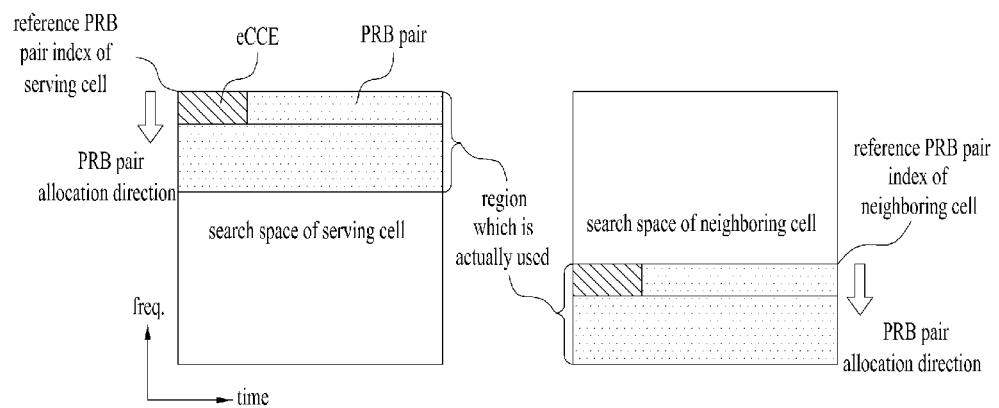
FIGS. 10 to 12 are diagrams illustrating a first embodiment of the present invention applied when some PRB pair is only mapped.
Figure 11:
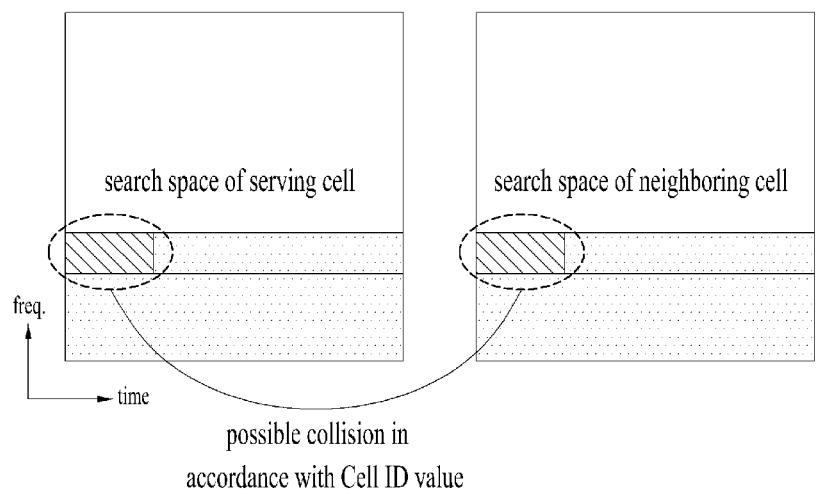
Figure 12:
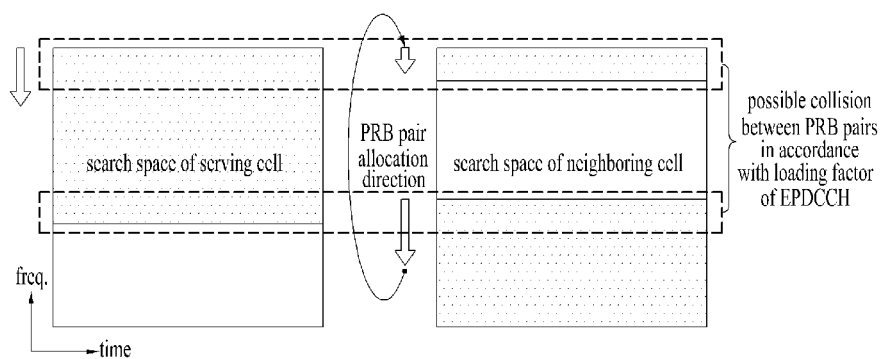

FIGS. 10 to 12 are diagrams illustrating a first embodiment of the present invention applied when some PRB pair is only mapped without fully filling a configured search space.

As illustrated in FIG. 10, according to the present invention, offset of the PRB pair is changed, whereby an effect caused by interference between EPDCCHs may be reduced. In other words, a reference index of PRB pair for allocating ECCE on the search spaces of the serving cell and the neighboring cell is varied, whereby collision between resources for EPDCCH transmission may not be generated.

However, even though different cell IDs are used, offset values of the PRB pairs may be equal to each other as illustrated in FIG. 11 (for example, based on $cell_{ID}$ mod $N_{RB}$, if cell IDs of the serving cell and the neighboring cell are multiples of $N_{RB}$). As illustrated in FIG. 12, if the search space is allocated to most of the PRB pairs due to the large amount of frequency resources required for EPDCCH transmission, the problem causing inter-cell interference may occur.

Also, in the first embodiment of the present invention, the PRB pairs for the EPDCCH search space may be determined differently for each cell.

Figure 13:
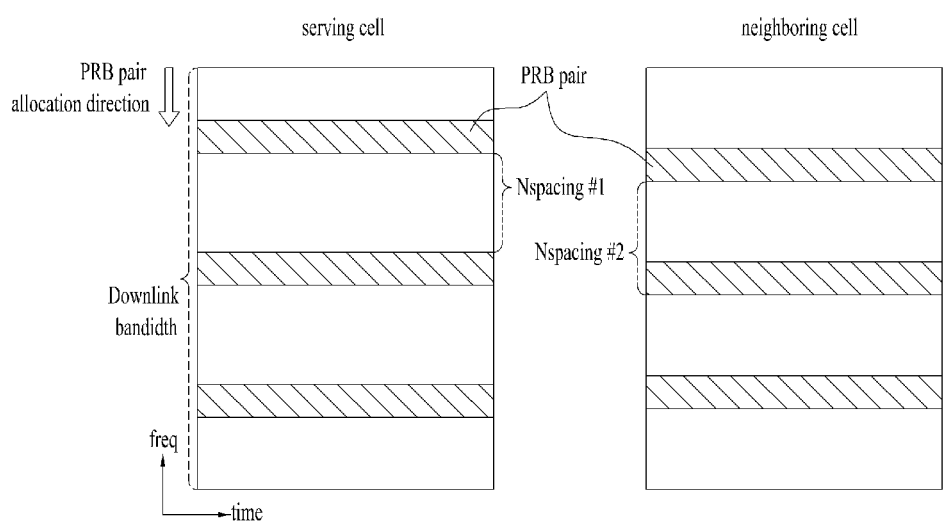
FIG. 13 is a diagram illustrating that PRB pairs for an EPDCCH search space are determined differently for each cell in accordance with the present invention.

FIG. 13 is a diagram illustrating that PRB pairs for the EPDCCH search space are determined differently for each cell.

Referring to FIG. 13, it is assumed that PRB pairs for the search space are distributed at certain intervals by starting allocation from PRB pair index having specific PRB pair offset at a downlink frequency band.

Supposing that the number of PRB pairs existing within the downlink bandwidth is $N_{RB}^{DL}$ and the number of PRB pairs constituting the search space is $N_{RB}$, $N_{spacing}$ which is space between the PRB pairs may be set to $$0 \leq N_{spacing} \leq \left\lfloor \frac{N_{RB}^{DL}}{N_{RB}} \right\rfloor.$$

At this time, a maximum value of $N_{spacing}$ is set to $$MAX_{spacing} = \left\lfloor \frac{N_{RB}^{DL}}{N_{RB}} \right\rfloor.$$

In this case, the resource for the EPDCCH may be mapped on the basis of the PRB pairs of different locations (that is, offset) between cells having different cell IDs as $N_{offset}$=cell_ID mod $N_{RB}$ where allocation of the PRB pairs starts.

Of course, even in this case, since collision may occur between the PRB pairs used in each cell, the spacing between the PRB pairs for the individual cell may be adjusted on the basis of the maximum spacing between the PRB pairs. For example, the spacing between the PRB pairs may be configured using information associated with subframe, and may be adjusted by adjusting a subframe number to the maximum spacing between the PRB pairs. In other words, the spacing between the PRB pairs may be set to $N_{spacing}$=SFN mod $MAX_{spacing}$. Namely, as shown in FIG. 13, since the spacing between the PRB pairs for the EPDCCH of the serving cell is $N_{spacing\#1}$, the spacing between the PRB pairs for the EPDCCH of the neighboring cell may be set to $N_{spacing\#2}$, whereby the resource for the EPDCCH may be mapped into the PRB pairs of different offsets.

Moreover, even though the PRB pairs of the same index are used, it may be configured such that EREG of different indexes may be used for each cell. For example, if the mapping rule between the ECCE and the EREG is fixed, inter-cell interference occurs when the ECCEs of the same index are selected by the PRB pairs of the same index. Accordingly, it is configured that reference EREG index may be changed for each cell to reduce interference.

For example, supposing that the number of ECCEs per PRB pair is $N_{CP}$ and the number of EREGs per ECCE is $N_{RC}$, the number $N_{RP}$ of EREGs existing in one PRB pair may be regarded as $N_{RC} \times N_{CP}$. At this time, offset of the reference PRB pair is $cell_{ID}$ mod $N_{RB}$, and is the same as a previous value, and EREG index value where mapping starts within the corresponding PRB pair may be set to $cell_{ID}$ mod $N_{RP}$. Accordingly, collision of the PRB pairs may be avoided using at least one of offset and spacing as illustrated in FIG. 13.

Figure 14:
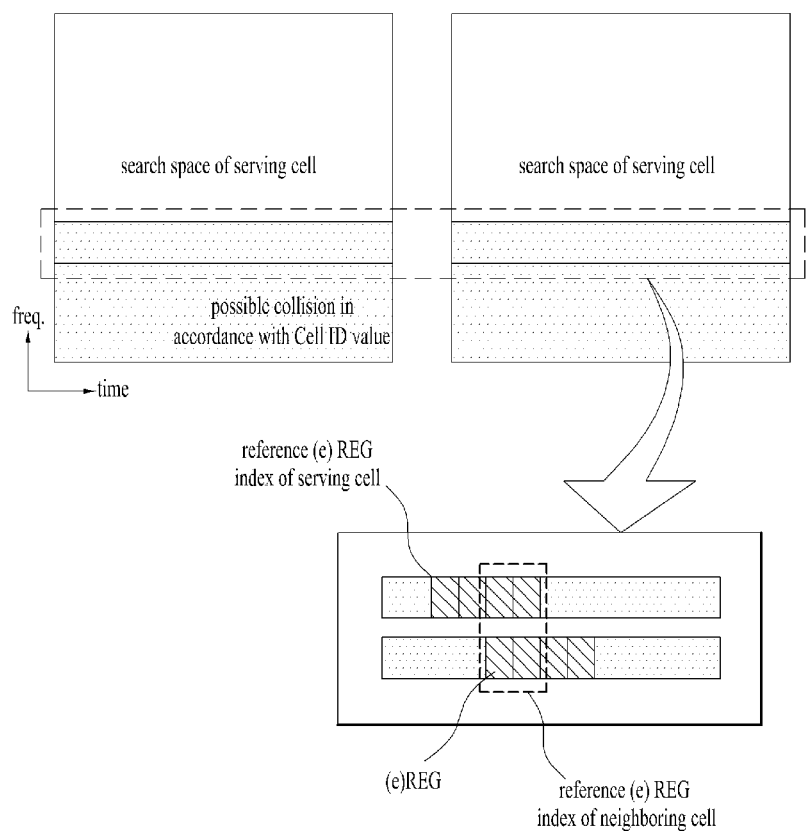
FIG. 14 is a diagram illustrating that a resource for an EPDCCH is mapped into PRB pairs of the same index to use EREG of different indexes in accordance with the present invention.

FIG. 14 is a diagram illustrating that a resource for an EPDCCH is mapped into PRB pairs of the same index to use EREG of different indexes. In other words, although the same PRB pair may be used in accordance with cell ID value, since reference EREG index is varied, the possibility of EREG collision of each ECCE is lowered. Namely, although all or some of the EREGs of each ECCE may be collided with one another, all the EREGs of the ECCE may not be collided with one another.

Second Embodiment

In the first embodiment of the present invention, offset of PRB pair index or EREG index is determined as far as the conventional mapping rule is applied to mapping between ECCE and EREG. However, the second embodiment of the present invention suggests a variable mapping rule between ECCE and EREG or between EREG and RE.

Accordingly, according to the second embodiment of the present invention, the mapping rule between the ECCE and the EREG may be varied between different cells or between different PRB pairs, whereby indexes of EREGs constituting each ECCE may be configured differently.

Figure 15:
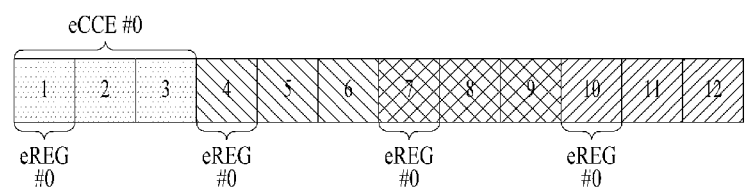
FIG. 15 is a diagram illustrating that ECCE is configured based on EREG having continuous indexes in accordance with the present invention.

FIG. 15 is a diagram illustrating that ECCE is configured based on EREG having continuous indexes in accordance with the present invention. For example, it is assumed that the number of ECCEs per PRB pair is 4 and the number $N_{RC}$ of EREGs per ECCE is 3 (a total of 12 EREGs exist per PRB pair).

Figure 16A:
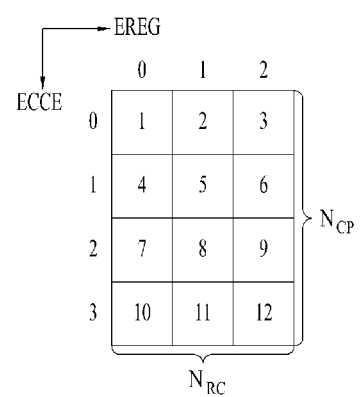
FIGS. 16a and 16b are diagrams illustrating indexes of EREG constituting ECCEs of FIG. 15 are divided into ECCE index axis and EREG axis.

FIG. 16 is a diagram illustrating indexes of EREG constituting ECCEs of FIG. 15 are divided into ECCE index axis and EREG axis. As an embodiment for varying the mapping rule between the ECCE and the EREG, an individual axis of FIG. 16(a) may be subjected to cyclic shift through permutation or offset. However, since simple permutation on EREG axis cannot vary ECCE mapping, it is preferable that permutation is performed on the ECCE axis. Also, it is preferable that permutation is not performed for reference EREG axis (that is, RE of which EREG index is 0 and ECCE index is also 0) of the first index to prevent the same pattern from being repeated.

For example, referring to FIG. 16(a), EREG index which is the first index (corresponding to index 0) is fixed, and the other EREG indexes are cyclic shifted on the ECCE axis. A pattern of a type expressed by the following Equation 1 may be made within the PRB pair that includes $N_{CP}$ number of ECCEs and $N_{RC}$ number EREGs per ECCE.

$$N_{pattern}=(N_{CP}-1)*N_{CP}^{(N_{RC}-1)} \qquad \text{[Equation 1]}$$

In the pattern of the $N_{pattern}$ type generated as above, a mapping pattern between the ECCE and the EREG for a specific PRB pair allocated to a specific cell may be determined as expressed by the following Equation 2.

$$n_{REG\_type}=(PRB\_ID+cell\_ID) \bmod N_{pattern} \quad \text{[Equation 2]}$$

Figure 16B:
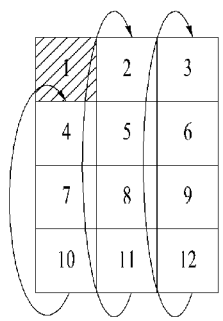

In other words, permutation may be performed based on a specific axis as illustrated in FIG. 16(b) in accordance with $n_{REG\_type}$ determined in the Equation 2.

Figure 17:
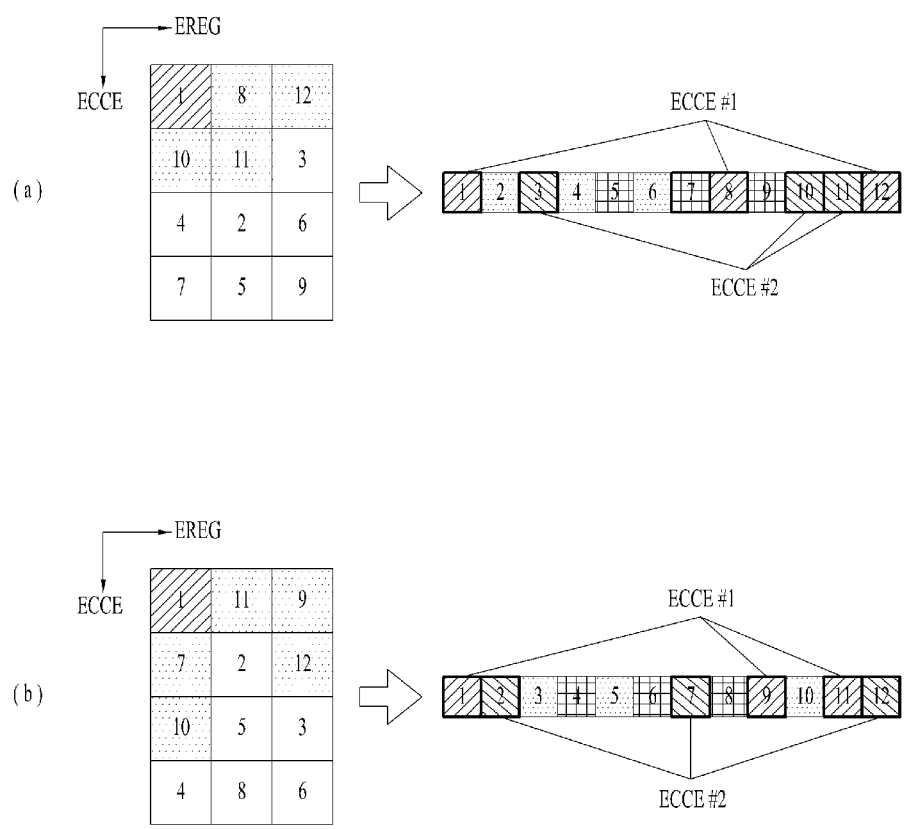
FIG. 17 is a diagram illustrating a method for performing permutation by applying an EREG mapping rule.

FIG. 17 is a diagram illustrating that permutation is performed by applying an EREG mapping rule of FIG. 16(b). In FIG. 17, it is noted that different EREG mapping patterns may be made in accordance with PRB pair for each cell, and inter-cell interference may be avoided through the different EREG mapping patterns.

In other words, supposing that FIG. 17(a) illustrates the mapping pattern between the ECCE and the EREG of the serving cell and FIG. 17(b) illustrates the mapping pattern between the ECCE and the EREG of the neighboring cell, ECCE#1 of the serving cell includes EREG#1, EREG#8 and EREG#12, and ECCE#1 of the neighboring cell includes EREG#1, EREG#11 and EREG#9. Accordingly, it results in collision of some EREGs only, and it is noted that interference is reduced. Also, since ECCE#2 includes EREG#10, EREG#11 and EREG#3 in case of the serving cell but includes EREG#2, EREG#7 and EREG#12 in case of the neighboring cell, collision of the EREGs does not occur.

Also, according to the second embodiment of the present invention, index (or location) of RE configured per EREG defined on a specific PRB pair may be varied based on a reference parameter, which is designated previously, to randomize inter-cell interference.

For example, the reference parameter may be set to physical cell ID (PCID), virtual cell ID, which is previously configured, PRB index, subframe index, slot index, or antenna port/scrambling ID configured for specific reference signal transmission.

In other words, cyclic offset value per OFDM symbol or cyclic offset increase/decrease value per OFDM symbol, which constitute a corresponding PRB pair designated by a specific PRB pair index on the basis of the reference parameter, may be varied to acquire inter-cell interference randomization effect.

Also, a resource region for realizing randomization between cells on the basis of the reference parameter may be defined by a time resource unit (for example, subframe (SF) or slot index) which is configured previously, a frequency resource unit (for example, PRB pair index), or combination of time/frequency units.

Accordingly, if the EREG used for PDCCH transmission is configured on the basis of the reference parameter, even though EPDCCH transmission is performed using the same EREG index between cells, since indexes (or locations) of REs constituting the same EREG index between the cells are configured randomly (that is, randomization effect) on the basis of the reference parameter which is configured previously, interference randomization effect between the same EREG indexes between the cells may be obtained.

Figure 18:
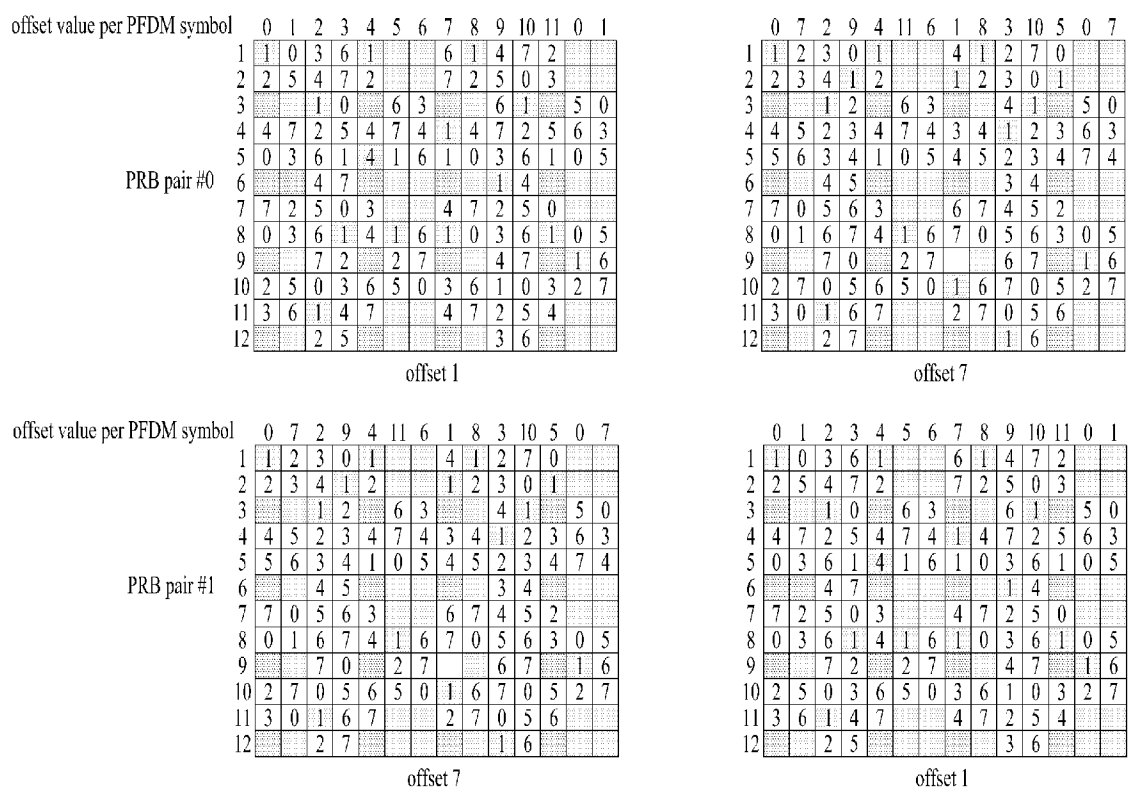

FIG. 18 is a diagram illustrating an embodiment of a method for transmitting an EPDCCH on the basis of reference parameters in accordance with the present invention. In FIG. 18, it is assumed that normal CP, 4-port DM-RS, and 4-port CRS are provided. According to the second embodiment of the present invention, if indexing for REs constituting EREG is performed, corresponding RE indexing may be performed on the basis of the other REs except for the REs used for DM-RS transmission which is assumed previously. In other words, according to the second embodiment of the present invention, RE indexing for each EREG may be performed on the frequency axis in an ascending order or a descending order. Although FIG. 18 illustrates the result of RE indexing performed on the frequency axis in an ascending order, RE indexing may be performed on the time axis in an ascending order or a descending order.

Referring to FIG. 18, among the resource elements (REs), the resource elements (REs) used for CRS, CSI-RS or PDCCH symbol is punctured or rate-matched during mapping between the EREG and the RE. Accordingly, since the EREGs may be affected with imbalance by a specific RS, RE imbalance may occur between the respective EREGs. Accordingly, the cyclic offset value per OFDM symbol or cyclic offset increase/decrease value per OFDM symbol, which may reduce RE imbalance to the maximum range, may be configured as a candidate. Supposing that the number of configured offset values is $N_{offset}$, index $n_{RE\_type}$ of the cyclic offset value per OFDM symbol or cyclic offset increase/decrease value per OFDM symbol, which is allocated to a specific cell for a specific PRB pair, may be determined as expressed by the following Equation 3.

$$n_{RE\_type}=(PRB\_ID+cell\_ID) \bmod N_{offset} \quad \text{[Equation 3]}$$

If two types of the offset increase value 1 and the offset increase value 7 are determined, offset 1 may be defined in case of $n_{RE\_type}=0$, and offset 7 may be defined in case of $n_{RE\_type}=1$. Accordingly, in the present invention, different types of offset increase values may be used between different PRB pairs and between different cells. As illustrated in FIG. 18, a randomized EREG is allocated as index of EREG allocated to each resource element (RE), such that collision of the EREGs between the PRB pairs having different $n_{RE\_type}$ values may be avoided.

Figure 19:
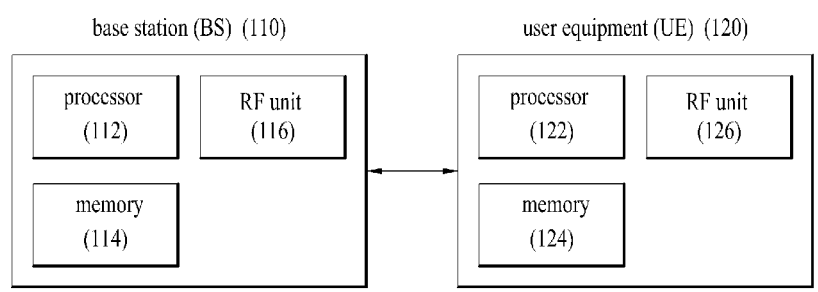
FIG. 19 is a diagram illustrating a wireless communication system to which the present invention is applied.

FIG. 19 is a diagram illustrating a base station and a user equipment which may be applied to the embodiment of the present invention. If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 19, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method for transmitting an enhanced downlink control channel in a wireless communication system and the apparatus therefor have been described based on the 3GPP LTE system, the method and apparatus may be applied to various wireless communication systems in addition to the 3GPP LTE system.

The invention claimed is:

1. A method for transmitting an enhanced a physical downlink control channel (EPDCCH) by a serving cell in a wireless communication system, the method comprising the steps of:
configuring a plurality of enhanced resource element groups (EREGs) by dividing available resource elements, which are included in one physical resource block (PRB) pair, into a predetermined number;
configuring an enhanced control channel element (ECCE), which is a resource allocation unit for the EPDCCH, by selecting one or more EREGs from the plurality of EREGs; and
transmitting the EPDCCH by using transmission resources allocated for the EPDCCH in a unit of the ECCE,
wherein one or more EREGs constituting the ECCE are selected on the basis of at least one of cell ID of the serving cell and index of the one PRB pair.

2. The method according to claim 1, wherein the one or more EREGs are selected in accordance with EREG index configured by performing permutation for the plurality of EREGs.

3. The method according to claim 2, wherein the permutation is performed in accordance with a pattern determined on the basis of at least one of the cell ID of the serving cell and the index of the one PRB pair.

4. The method according to claim 2, wherein the permutation is performed for the EREGs except for EREG that satisfies a predetermined condition.

5. The method according to claim 4, wherein the predetermined condition is characterized in that the EREG index is 0.

6. A serving cell for transmitting an enhanced physical downlink control channel (EPDCCH) in a wireless communication system, the serving cell comprising:
a radio frequency (RF) unit; and
a processor,
wherein the processor configures a plurality of enhanced resource element groups (EREGs) by dividing available resource elements, which are included in one physical resource block (PRB) pair, into a predetermined number, and configures an enhanced control channel element (ECCE), which is a resource allocation unit for the EPDCCH, by selecting one or more EREGs from the plurality of EREGs,
the RF unit is configured to transmit the EPDCCH by using transmission resources allocated for the EPDCCH in a unit of the ECCE, and
one or more EREGs constituting the ECCE are selected on the basis of at least one of cell ID of the serving cell and index of the one PRB pair.

7. The serving cell according to claim 6, wherein the one or more EREGs are selected in accordance with EREG index configured by performing permutation for the plurality of EREGs.

8. The serving cell according to claim 7, wherein the permutation is performed in accordance with a pattern determined on the basis of at least one of the cell ID of the serving cell and the index of the one PRB pair.

9. The serving cell according to claim 7, wherein the permutation is performed for the EREGs except for EREG that satisfies a predetermined condition.

10. The serving cell according to claim 9, wherein the predetermined condition is characterized in that the EREG index is 0.

* * * * *